(12) United States Patent
Manor et al.

(10) Patent No.: US 10,417,598 B1
(45) Date of Patent: Sep. 17, 2019

(54) SYSTEM, METHOD, AND COMPUTER PROGRAM FOR MAPPING DATA ELEMENTS FROM A PLURALITY OF SERVICE-SPECIFIC DATABASES INTO A SINGLE MULTI-SERVICE DATA WAREHOUSE

(71) Applicant: Amdocs Software Systems Limited, Dublin (IE)

(72) Inventors: Eran Manor, Timrat (IL); Eyal Almog, Petach Tikva (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 947 days.

(21) Appl. No.: 14/253,786

(22) Filed: Apr. 15, 2014

Related U.S. Application Data (60) Provisional application No. 61/818,461, filed on May 2, 2013.

(51) Int. Cl.
*G06F 7/00* (2006.01)
*G06Q 10/06* (2012.01)
*H04M 15/00* (2006.01)
*G06Q 30/02* (2012.01)
*G06F 16/25* (2019.01)

(52) U.S. Cl.
CPC ....... *G06Q 10/067* (2013.01); *G06Q 30/0201* (2013.01); *H04M 15/58* (2013.01); *G06F 16/254* (2019.01)

(58) Field of Classification Search
CPC .................. G06F 17/30943; G06F 16/254
USPC .................. 1/737; 707/602, 755, 737
See application file for complete search history.

(56) References Cited

U.S. PATENT DOCUMENTS

| | | | |
|---|---|---|---|
| 8,782,220 B2 * | 7/2014 | Schimpfky | G06F 11/3003 709/224 |
| 2005/0234969 A1 * | 10/2005 | Mamou | G06Q 10/10 |
| 2005/0243604 A1 * | 11/2005 | Harken | G06F 8/51 365/185.22 |
| 2005/0251533 A1 * | 11/2005 | Harken | G06F 17/2247 |
| 2007/0011175 A1 * | 1/2007 | Langseth | G06F 16/254 |
| 2007/0011183 A1 * | 1/2007 | Langseth | G06F 16/313 |
| 2009/0112875 A1 * | 4/2009 | Maes | G06F 17/30575 |
| 2010/0082532 A1 * | 4/2010 | Shaik | G06F 16/254 707/609 |

(Continued)

*Primary Examiner* — Eliyah S. Harper
(74) *Attorney, Agent, or Firm* — Zilka-Kotab, P.C.

(57) ABSTRACT

A system, method, and computer program product are provided for mapping data elements from a plurality of service-specific databases into a single multi-service data warehouse. In use, a multi-service data model is generated for creating a single multi-service data warehouse, the multi-service data model including a plurality of multi-service data elements. Additionally, a plurality of rules are generated for mapping each of the plurality of multi-service data elements to a plurality of service-specific data elements, the plurality of service-specific data elements being included in a disparate one or more of a plurality service-specific data models associated with one or more of a plurality of service-specific databases. Further, the plurality of rules are utilized for automatically importing data from at least some of the service-specific databases into the single multi-service data warehouse.

14 Claims, 7 Drawing Sheets

(56) References Cited

U.S. PATENT DOCUMENTS

2011/0077958 A1\* 3/2011 Breitenstein .......... G06Q 10/10
  705/2
2013/0138601 A1\* 5/2013 Mahalanabis ......... G06F 16/254
  707/602

\* cited by examiner

SYSTEM, METHOD, AND COMPUTER PROGRAM FOR MAPPING DATA ELEMENTS FROM A PLURALITY OF SERVICE-SPECIFIC DATABASES INTO A SINGLE MULTI-SERVICE DATA WAREHOUSE

CLAIM OF PRIORITY

This application claims the benefit of U.S. Provisional Application No. 61/818,461, filed May 2, 2013, the entire contents of which are incorporated herein by reference.

FIELD OF THE INVENTION

The present invention relates to reducing risk and implementation effort typically, associated with data warehouse (DW) and business intelligence (BI) projects associated with telecommunication network service providers.

BACKGROUND

Business intelligence relates to a set of theories, methodologies, processes, architectures, and/or technologies that transform raw data into meaningful and useful information. At the heart of any business intelligence solution, there is typically a central consolidated data base, called a data warehouse (DW), that captures data in a way in which it can be projected as meaningful information and provide valuable insight to a user. One use of a data warehouse business intelligence solution could be, for example, to create trend reports for senior management, such as annual and quarterly comparisons.

Creating a data warehouse for a telecommunication service provider is a challenging task for various reasons. For example, typically, there are multiple systems which hold customer data and consumption patterns of subscribers to the service provider. For a subscription based business, the consolidating and validating such data is useful, Additionally, there is a large amount of data that should be integrated and modeled in a unique way to enable fast and smart analytics. Further, the specific business processes and operations of the service provider require specific data and information management standards.

There is thus a need for addressing these and/or other issues associated with the prior art.

SUMMARY

A system, method, and computer program product are provided for mapping data elements from a plurality of service-specific databases into a single multi-service data warehouse. In use, a multi-service data model is generated for creating a single multi-service data warehouse, the multi-service data model including a plurality of multi-service data elements. Additionally, a plurality of rules are generated for mapping each of the plurality of multi-service data elements to a plurality of service-specific data elements, the plurality of service-specific data elements being included in a disparate one or more of a plurality service-specific data models associated with one or more of a plurality of service-specific databases. Further, the plurality of rules are utilized for automatically importing data from at least some of the service-specific databases into the single multi-service data warehouse.

DETAILED DESCRIPTION

Figure 1:
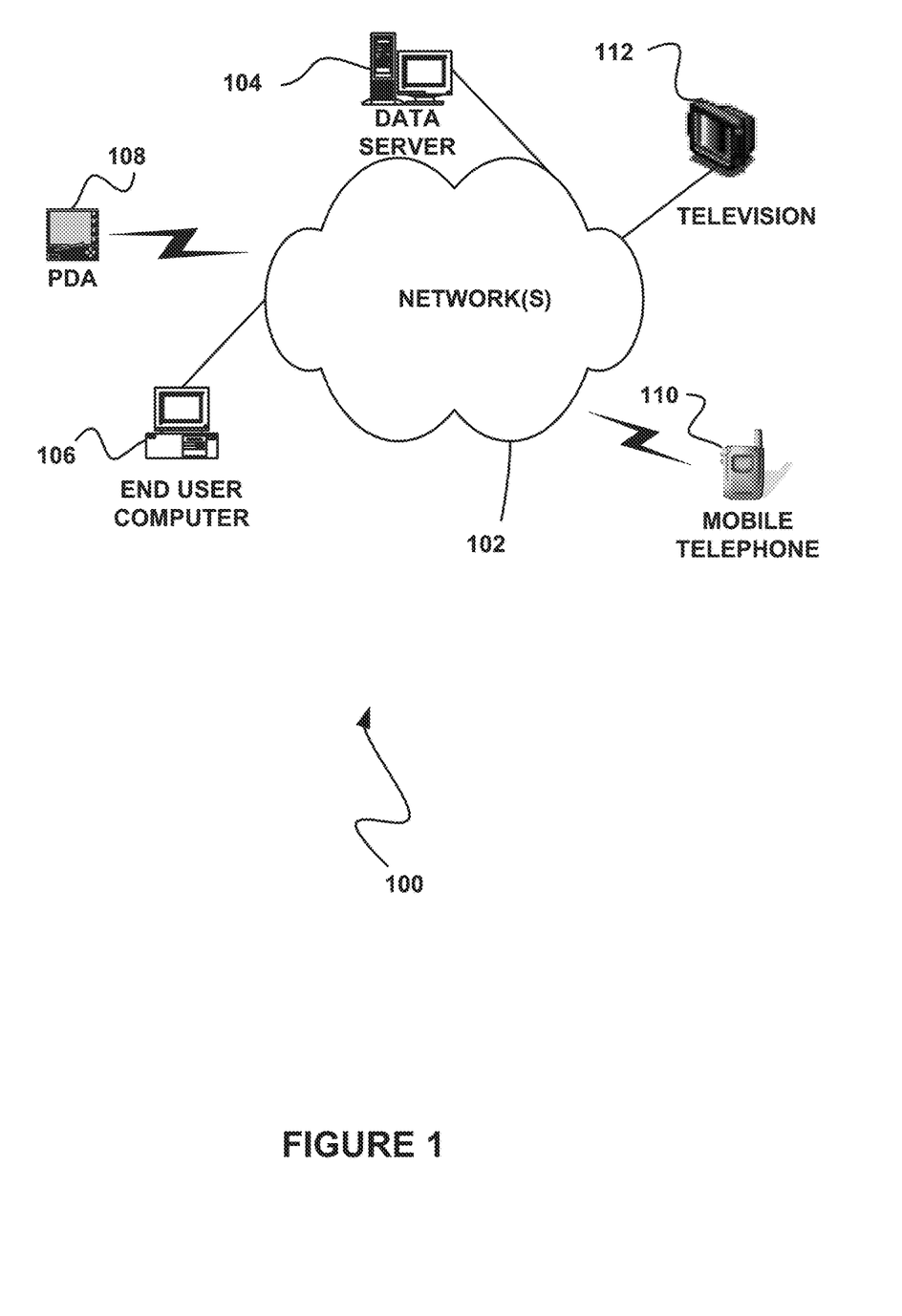
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
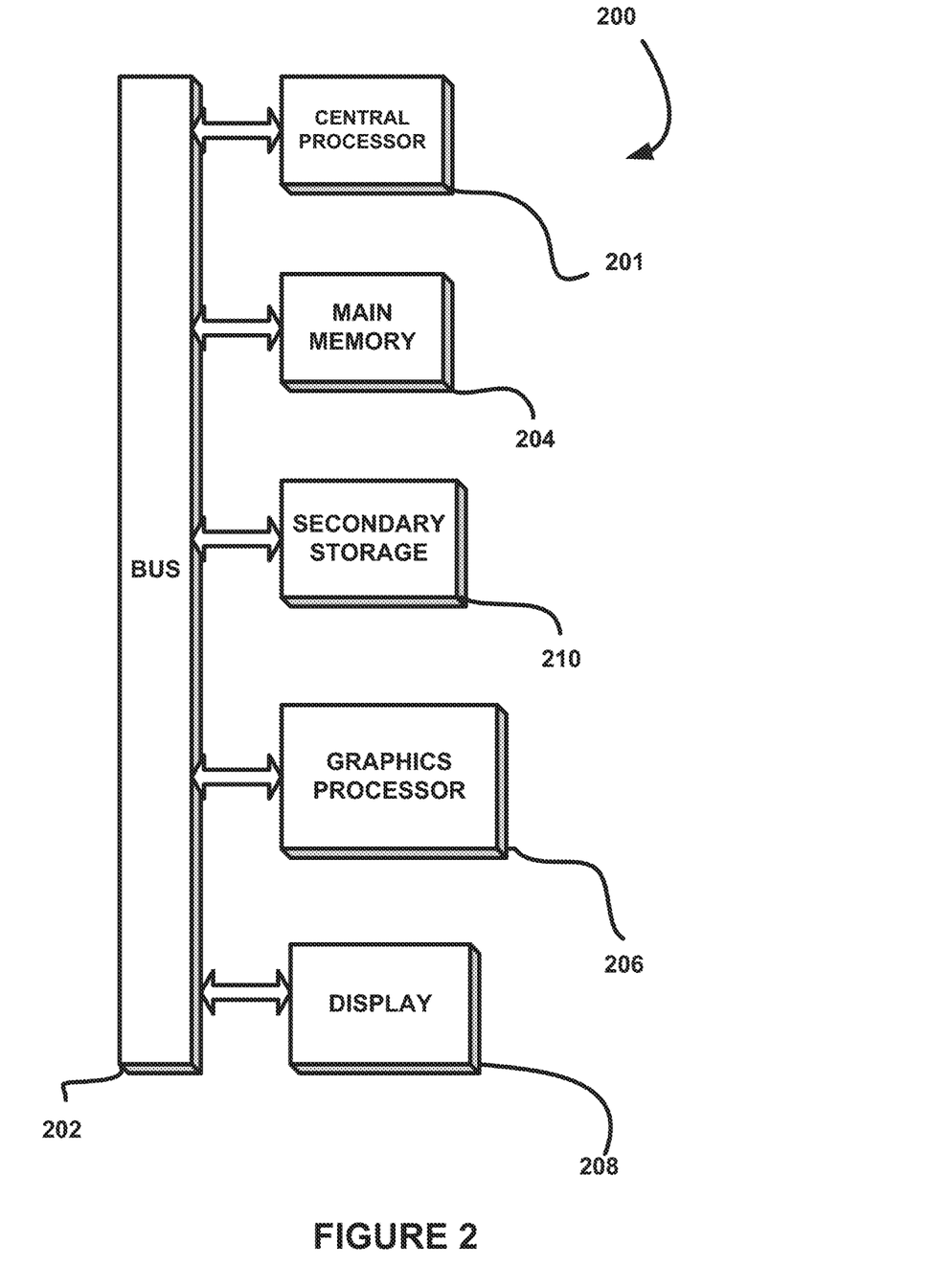
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 104) of FIG. 1, Of course, the system 200 may be implemented in any desired environment.

As shown, a system 200 is provided including at least one central processor 201 which is connected to a communication bus 202, The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
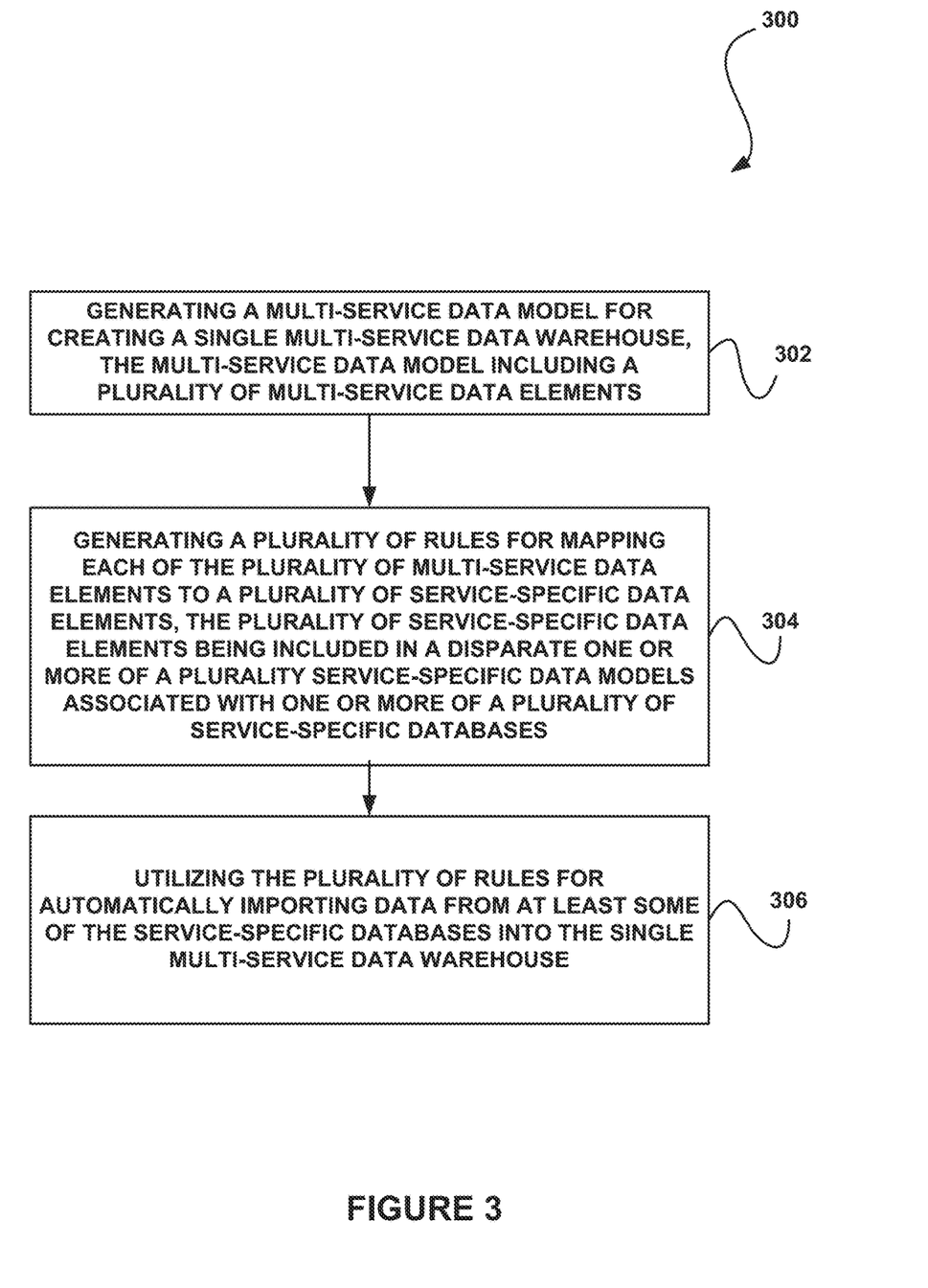
FIG. 3 illustrates a method for mapping data elements from a plurality of service-specific databases into a single multi-service data warehouse, in accordance with one embodiment.

FIG. 3 illustrates a method 300 for mapping data elements from a plurality of service-specific databases into a single multi-service data warehouse, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a multi-service data model is generated for creating a single multi-service data warehouse, the multi-service data model including a plurality of multi-service data elements. See operation 302. The multi-service data model may include any data model capable of being used to create a single data warehouse from a plurality of data warehouses and/or databases.

In one embodiment, the multi-service data model may include a logical data model (LDM). For example, in one embodiment, the multi-service data model may include a telecommunications-specific logical data model.

In the context of the present description, a data warehouse refers to a central consolidated data base capable of capturing data in a way that can be projected as user-friendly information. In one embodiment, the single multi-service data warehouse may include a telecommunication service provider data warehouse.

As shown further in FIG. 3, a plurality of rules are generated for mapping each of the plurality of multi-service data elements to a plurality of service-specific data elements, the plurality of service-specific data elements being included in a disparate one or more of a plurality service-specific data models associated with one or more of a plurality of service-specific databases. See operation 304.

The rules may include any rule capable of being used to map the plurality of multi-service data elements to the plurality of service-specific data elements. In one embodiment, each rule of the rules may be accordance with business logic associated with a telecommunication service provider. In this case, the business logic may function to determine that each of the plurality of service-specific data elements mapped by the rules to the multi-service data element have at least similar business significance to the telecommunication service provider.

As an example, the similar business significance may include or be associated with information associated with one or more customers. As another example, the similar business significance may include or be associated with information associated with marketing. As another example, the similar business significance may include or be associated with information associated with sales.

Further, the multi-service data elements and the plurality of service-specific data elements may include any data element associated with billing, network traffic, content, invoicing, data collection, products, ordering, customers, accounts receivable, sales, marketing, customer service, fulfillment, and/or any other data element associated with a database or data warehouse.

The plurality of service-specific databases may include any type of database associated with a product and/or a service. For example, in various embodiments, the plurality of service-specific databases may be associated with one or more of a billing system, a revenue management system, a customer relation management system, and/or an ordering management system, etc.

In one embodiment, generating the plurality of rules for mapping each of the plurality of multi-service data elements to the plurality of service-specific data elements may include generating the plurality of rules for mapping at least one of information associated with customer billing activity or information associated with customer ordering activity, to the multi-service data elements. Of course, in various embodiments, the rules generated may function to map any type of data elements.

With further reference to FIG. 3, the plurality of rules are utilized for automatically importing data from at least some of the service-specific databases into the single multi-service data warehouse. See operation 306.

In one embodiment, the multi-service data model may include one or more of entity diagrams and relationship diagrams that are associated with a dimensional data model. In one embodiment, the dimensional data model may describe transactional data and/or events associated with the plurality service-specific data models. Further, in one embodiment, the dimensional data model may describe entities and descriptive elements associated with the plurality service-specific data models.

Additionally, in one embodiment, the multi-service data model may include one or more physical table definitions mapped to one or more data elements associated with one or more of a billing system, a revenue management system, a customer relation management system, and/or an ordering management system, etc. Of course, in various embodiments, the physical table definitions may be mapped to data elements associated with any type of system.

Furthermore, in one embodiment, the multi-service data model may include one or more attribute sources mapped to one or mote data elements associated with one or more of a billing system, a revenue management system, a customer relation management system, and/or an ordering management system, etc. Of course, in various embodiments, the attribute sources may be mapped to data elements associated with any type of system.

Still yet, in one embodiment, the plurality of rules may include rules for automatically mapping each of the plurality of multi-service data elements to the plurality of service-specific data elements, based on a Shared Information and Data (SID) model industry standard. Of course, various standards and/or techniques may be utilized for the mapping, in various embodiments.

In one embodiment, the method 300 may further include automatically generating one or more reports utilizing the multi-service data model. For example, the multi-service data model maybe associated with a set of pre-defined dashboards and reports that are built over the physical data model. As an example, the dashboard may highlight the most relevant key performance indicators (KPIs) within business areas and may include a drill down level for specific and detailed information.

Further, in one embodiment, the multi-service data model and/or the multi-service data warehouse may include logical database layers. For example, the single multi-service data warehouse may include a summary data store where data is aggregated and de-normalized to address analytics associated with a business. In another embodiment, the single multi-service data warehouse may include profiles where data is kept on per customer basis as a behavior profile, where the behavior profile includes key performance indicators associated with the customer that are capable of being tracked, monitored, and analyzed. Of course, in various embodiments, the multi-service data model and/or the multi-service data warehouse may include any number of logical database layers.

In one embodiment, the method 300 may function to reduce risk and implementation effort typically associated with data warehouse and business intelligence projects.

Furthermore, the method 300 may function to eliminate major project components such as analysis, design, data modeling, and data integration while using a pre-mapped data model and integration engine. Additionally, an industry-specific communication data model may be implemented to create clearer and more reliable information, which can be used in service providers' analytics systems.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
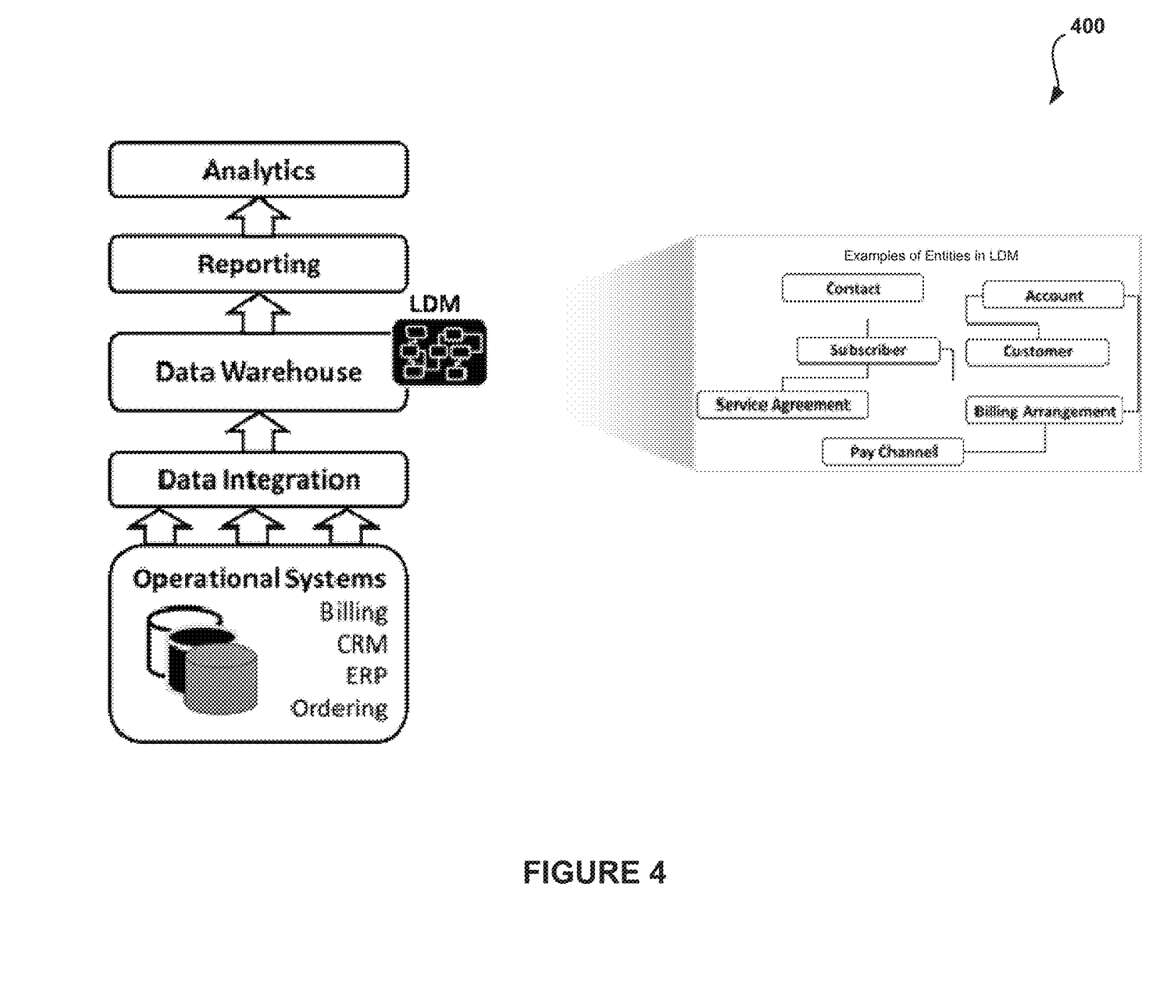
FIG. 4 illustrates a multi-service data model implementation for mapping data elements from a plurality of service-specific databases into a single multi-service data warehouse, in accordance with one embodiment.

FIG. 4 illustrates a multi-service data model implementation 400 for mapping data elements from a plurality of service-specific databases into a single multi-service data warehouse, in accordance with one embodiment. As an option, the multi-service data model implementation 400 may be implemented in the context of the details of FIGS. 1-3. Of course, however, the multi-service data model implementation 400 may be implemented in the context of any desired environment. Further, the aforementioned definitions may equally apply to the description below.

FIG. 4 describes one example of a data warehouse/business intelligence project in which a multi-service data model may be utilized. In this example, the multi-service data model may include a logical data model (LDM).

In this case, the logical data model my automatically map data elements from billing systems, revenue management systems (RM), customer relation management systems (CRM), and ordering management systems (OMS) of telecommunication service providers into a single generic customer-centric telecommunication data model. The telecommunications-specific logical data model may contain several business areas that map most or all of the customer activity and characteristics within the service provider's communication services.

Figure 5:
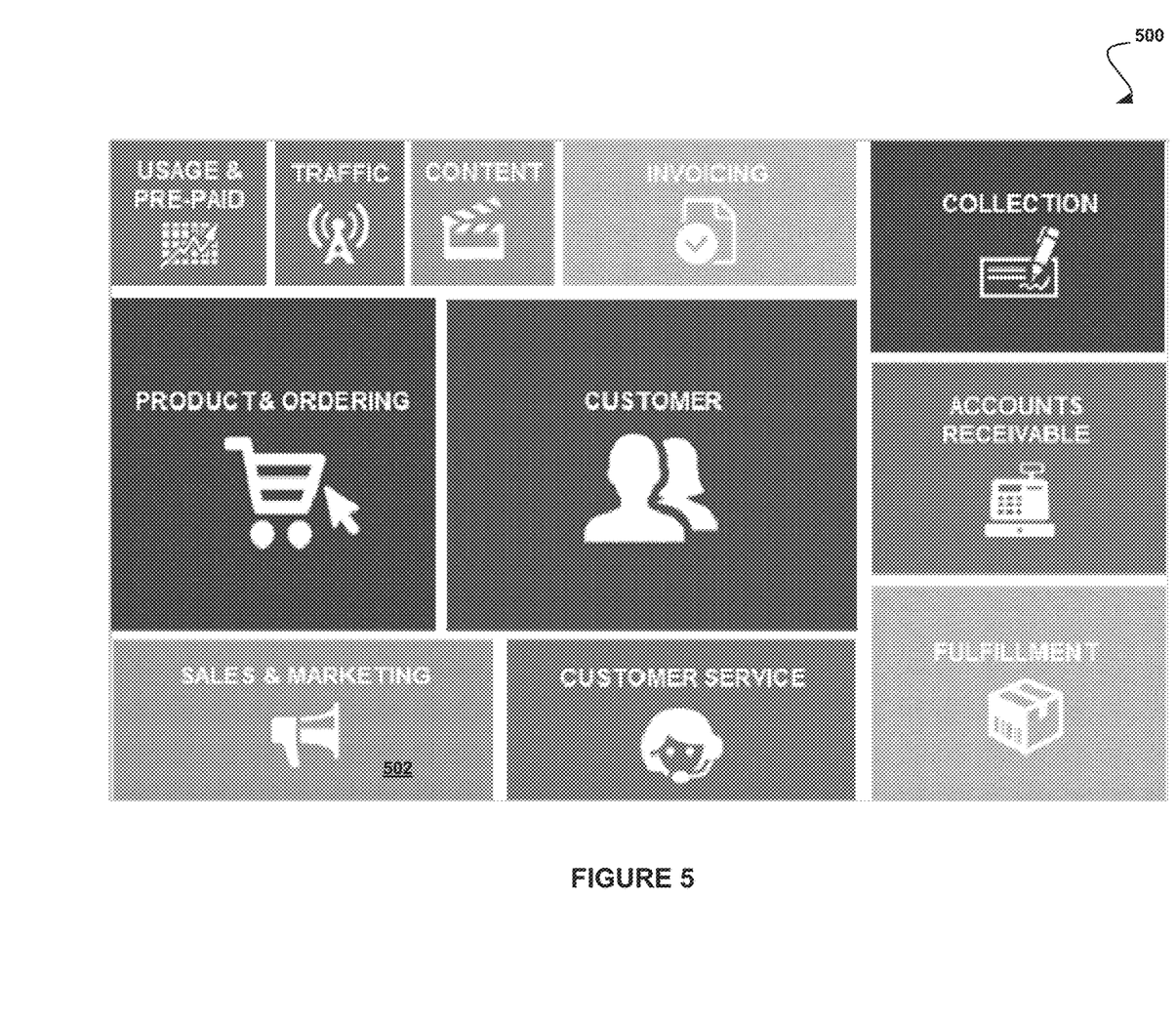
FIG. 5 illustrates a block diagram illustrating possible business areas covered in a telecommunication logical data model, in accordance with one embodiment.

FIG. 5 illustrates a block diagram 500 illustrating possible business areas covered in a telecommunication logical data model, in accordance with one embodiment. As an option, the block diagram 500 may be implemented in the context of the details of FIGS. 1-4, Of course, however, the block diagram 500 may be implemented in the context of any desired environment. Further, the aforementioned definitions may equally apply to the description below.

As an example implementation, a sales domain in a CRM application may contain several data elements that describe the sale cycle, the buyer, the product, and the employee, which may be mapped to a sales and marketing logical data model business area 502. A marketing domain of an additional marketing automation application may contain data elements describing the promotions, leads, prospects, response rate, and marketing effort that may also be mapped to the sales and marketing logical data model business area 502, thereby creating a correlated view from marketing and sales aspects. Furthermore, other systems such as billing systems and call center systems may also be mapped to the same target logical data model, thereby creating a holistic view of the process and customers in a single information platform.

Additionally, data elements may be duplicated and defined several times on each system. Therefore, transformations and translation rules may be provided in the data model for creating a single view for each data element.

In one embodiment, the logical data model may include a set of entity and relations diagrams that are driven by a dimensional data modeling approach by describing transactional data and events as facts and entities and descriptive elements as dimensions, thereby allowing an easy retrieval of data. Furthermore, in various embodiments, the logical data model may include physical table definitions, table source and/or attribute source mapping to revenue management, customer relation management, and ordering management systems for each attribute definition in the model.

In one embodiment, the entities may be kept in three logical database layers. For example, a detailed data store may represent row data and detailed data, where data is kept normalized, thus enabling the flexibility of data processing. As another example, a summary data store may be included and allow data to be aggregated and de-normalized to address analytic needs of a business. As another example, data may be kept on a per subscriber/customer basis as a behavior profile. Further, key performance indicators may be calculated for each subscriber for tracking, monitoring, and analyzing. In addition to the detailed design and discovery process that is pre-built and pre-mapped, some or all of the integration maps and processes may be pre-built to create a package that may be installed and customized.

In one embodiment, the mapping may be done automatically, based on the Shared information and Data (SID) model industry standard. For example, billing, customer resource management, and ordering applications that are implemented according to the telecommunications industry standard typically include SID object descriptions, commonly formatted as "Entity_name::Attribute_Name," Accordingly, in one embodiment, the repositories of each application may be automatically parsed, SID objects may be detected, and they may be mapped to a logical data model SID definition, thereby creating an out-of the box analytical database.

Further, in one embodiment, the logical data model may include a set of pre-defined dashboards and reports that are built over the physical data model. For example, the dashboard may highlight the most relevant KPIs within business areas and may include a drill down level for specific and detailed information. That part of the logical data model may function to shorten the time of implementing the front-end layer of the business intelligence/data warehouse implementation, and give visibility to the business users.

Figure 6:
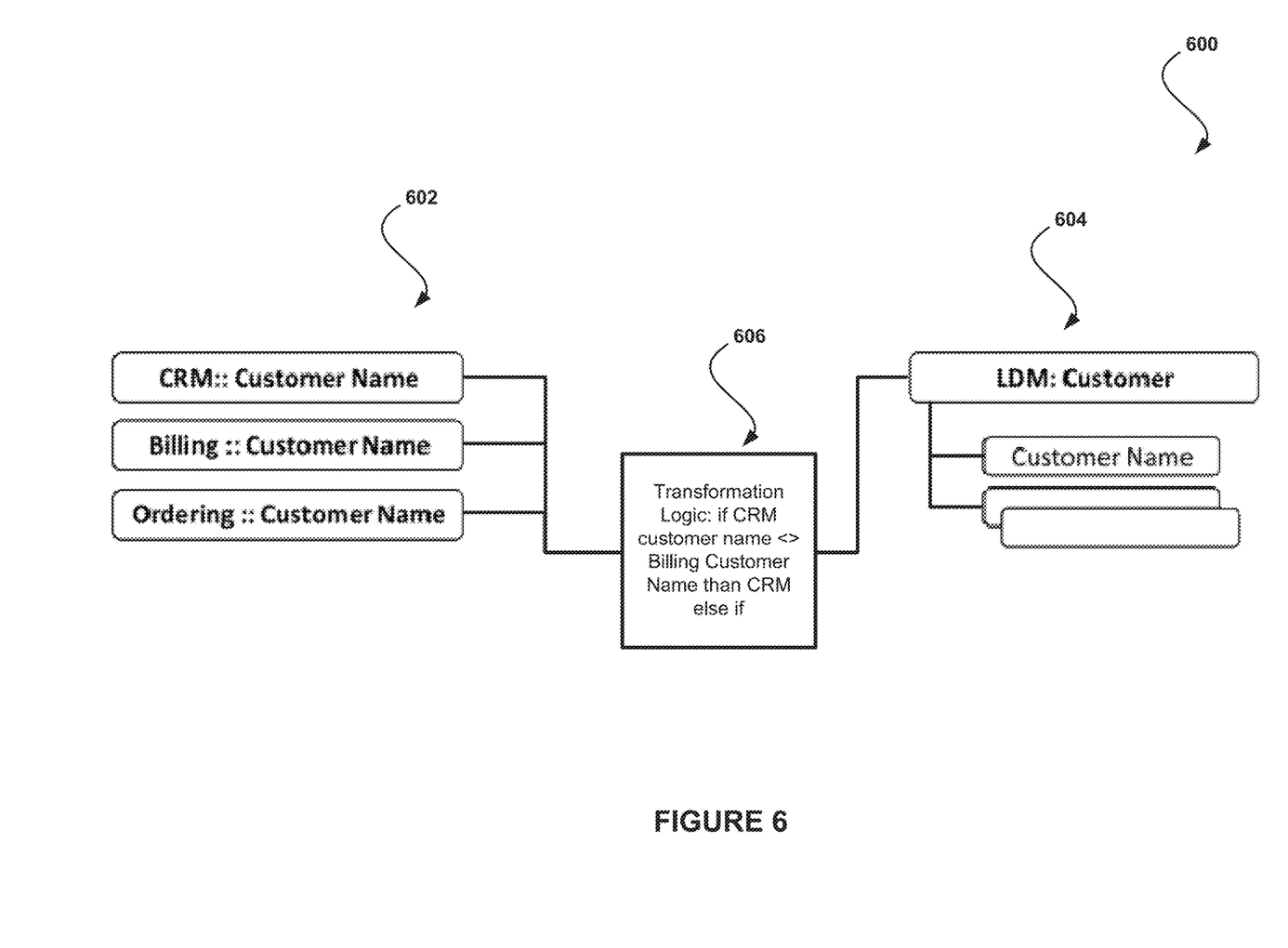
FIG. 6 illustrates a data transformation example showing transformation between a source system to a target logical data model, in accordance with one embodiment.

FIG. 6 illustrates a data transformation example 600 showing transformation between a source system to a target logical data model, in accordance with one embodiment. As an option, the data transformation example 600 may be implemented in the context of the details of FIGS. 1-5. Of course, however, transformation example 600 may be implemented in the context of any desired environment. Further, the aforementioned definitions may equally apply to the description below.

As shown, a source system (or a plurality of source systems, etc.) may include a plurality of data elements 602. Such elements 602 may be associated with a CRM system, a billing system, and/or an ordering system, etc. The elements are transformed between the source system to a target logical data model 604 utilizing transformation logic 606.

Figure 7:
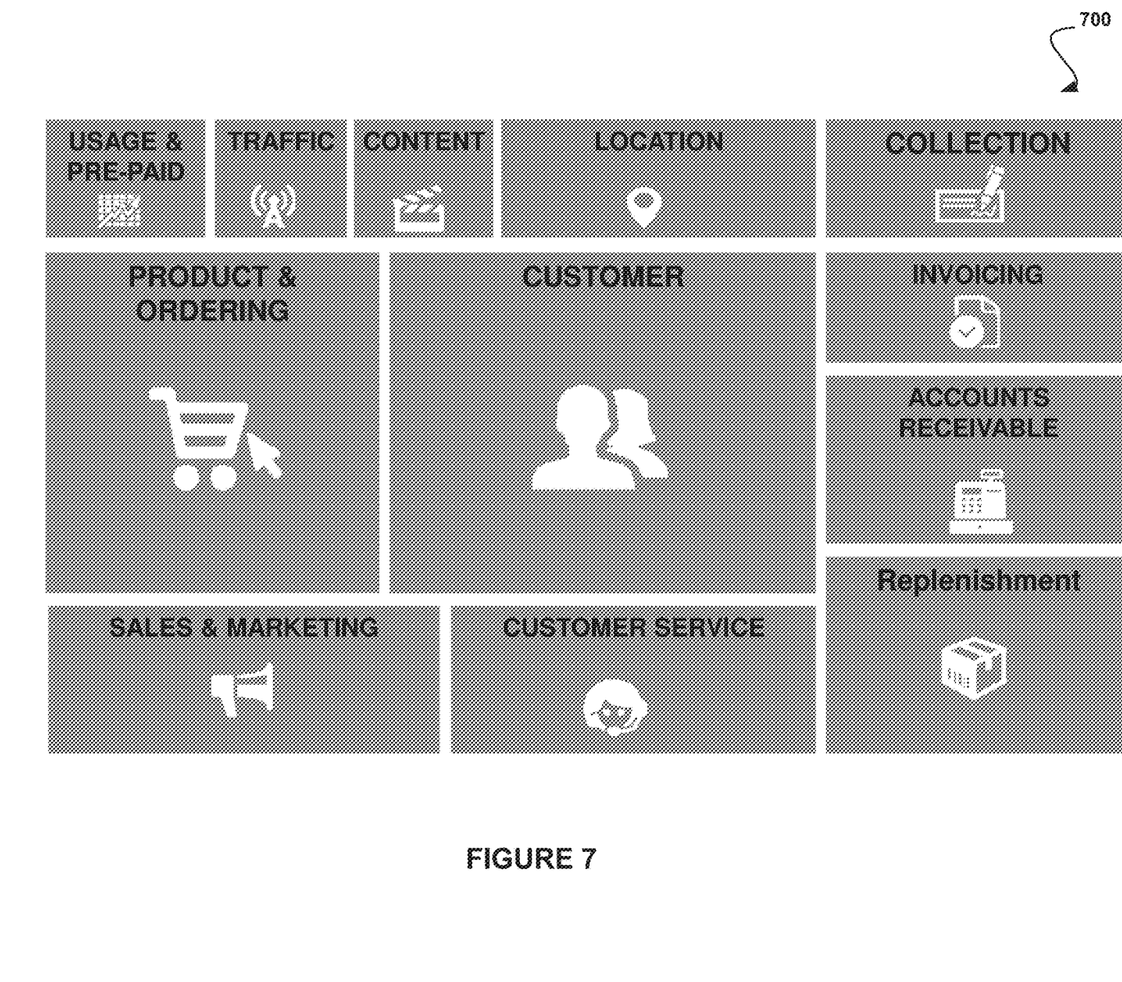
FIG. 7 illustrates a block diagram illustrating possible business areas covered in a telecommunication logical data model, in accordance with another embodiment.

FIG. 7 illustrates a block diagram 700 illustrating possible business areas covered in a telecommunication logical data model, in accordance with another embodiment. As an option, the block diagram 700 may be implemented in the context of the details of FIGS. 1-6. Of course, however, the block diagram 700 may be implemented in the context of any desired environment. Further, the aforementioned definitions may equally apply to the description below.

As previously noted, a sales domain in a CRM application may contain several data elements that describe the sale cycle, the buyer, the product, and the employee, which may be mapped to a sales and marketing logical data model business area. A marketing domain of an additional marketing automation application may contain data elements describing the promotions, leads, prospects, response rate, and marketing effort that may also be mapped to the sales and marketing logical data model business area, thereby creating a correlated view from marketing and sales aspects. Furthermore, other systems such as billing systems and call center systems may also be mapped to the same target logical data model, thereby creating a holistic view of the process and customers in a single information platform.

In one embodiment, a primary source of data from which the logical data model may pull data is the BSS/OSS operational systems, and optionally additional data marts that include customer data, and/or ERP systems, etc.

In another embodiment, the logical data model may also collect and aggregate data coming from a Network. In this case, the data may come in the shape of files with customer usage data and/or CDRs/EDRs. Further, as shown in the logical data model 700, location data may be included.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable storage medium storing computer code executable by a processor to perform a method comprising:
generating a multi-service data model having a plurality of multi-service data elements and being specific to a single multi-service data warehouse that is a central consolidated database;
identifying a plurality of service-specific data elements included in a plurality of service-specific databases;
automatically mapping the plurality of multi-service data elements in the multi-service data model to the plurality of service-specific data elements in the plurality of service-specific databases, wherein the mapping correlates each of the multi-service data elements in the plurality of multi-service data elements with one or more of the service-specific data elements in the plurality of service-specific data elements based on an association of the multi-service data element and of the one or more of the service-specific data elements with a common business category, the automatic mapping being performed by:
(a) automatically parsing the service-specific databases,
(b) based on the parsing, identifying from the service-specific databases the service-specific data elements and descriptions associated therewith,
(c) identifying descriptions of the multi-service data elements in the multi-service data model, and
(d) using the identified descriptions associated with the service-specific data elements and the identified descriptions of the multi-service data elements, mapping each of the service-specific data elements in the plurality of service-specific data elements to one of the multi-service data elements in the multi-service data model;
storing mapping rules indicative of the mapping;
storing, in the multi-service data model, transformation and translation rules for removing duplicated service-specific data elements identified from the service-specific databases;
automatically importing data from the service-specific databases into the single multi-service data warehouse, including:
identifying data elements in the service-specific databases that are associated with a billing system, a revenue management system, a customer relation management system, and an ordering management system,
applying the transformation and translation rules to the data elements for creating a single view for each of the data elements, and
storing the single view for each of the data elements in the single multi-service data warehouse according to the mapping rules.

2. The non-transitory computer readable storage medium of claim 1, wherein the automatic mapping is performed using business logic of a telecommunication service provider.

3. The non-transitory computer readable storage medium of claim 2, wherein the single multi-service data warehouse is provided by the telecommunication service provider.

4. The non-transitory computer readable storage medium of claim 1, wherein the multi-service data model includes one or more of entity diagrams and relationship diagrams that are associated with a dimensional data model.

5. The non-transitory computer readable storage medium of claim 4, wherein the dimensional data model describes transactional data and events associated with the plurality service-specific databases.

6. The non-transitory computer readable storage medium of claim 1, wherein the multi-service data model includes one or more physical table definitions mapped to the service-specific data elements.

7. The non-transitory computer readable storage medium of claim 1, wherein the multi-service data model includes one or more attribute sources mapped to the service-specific data elements.

8. The non-transitory computer readable storage medium of claim 1, further comprising automatically generating one or more reports utilizing the multi-service data model.

9. The non-transitory computer readable storage medium of claim 1, wherein the single multi-service data warehouse includes a summary data store where data is aggregated and de-normalized to address analytics associated with a business.

10. The non-transitory computer readable storage medium of claim 1, wherein the single multi-service data warehouse includes profiles where data is kept on per customer basis as a behavior profile, the behavior profile including key performance indicators associated with the customer that are capable of being tracked, monitored, and analyzed.

11. A method, comprising:
generating a multi-service data model having a plurality of multi-service data elements and being specific to a single multi-service data warehouse that is a central consolidated database;
identifying a plurality of service-specific data elements included in a plurality of service-specific databases;
automatically mapping the plurality of multi-service data elements in the multi-service data model to the plurality of service-specific data elements in the plurality of service-specific databases, wherein the mapping correlates each of the multi-service data elements in the plurality of multi-service data elements with one or more of the service-specific data elements in the plurality of service-specific data elements based on an association of the multi-service data element and of the one or more of the service-specific data elements with a common business category, the automatic mapping being performed by:
(a) automatically parsing the service-specific databases,
(b) based on the parsing, identifying from the service-specific databases the service-specific data elements and descriptions associated therewith,
(c) identifying descriptions of the multi-service data elements in the multi-service data model, and
(d) using the identified descriptions associated with the service-specific data elements and the identified descriptions of the multi-service data elements, mapping each of the service-specific data elements in the plurality of service-specific data elements to one of the multi-service data elements in the multi-service data model;
storing mapping rules indicative of the mapping;
storing, in the multi-service data model, transformation and translation rules for removing duplicated service-specific data elements identified from the service-specific databases;
automatically importing data from the service-specific databases into the single multi-service data warehouse, including:
  identifying data elements in the service-specific databases that are associated with a billing system, a revenue management system, a customer relation management system, and an ordering management system,
  applying the transformation and translation rules to the data elements for creating a single view for each of the data elements, and
storing the single view for each of the data elements in the single multi-service data warehouse according to the mapping rules.

12. A system comprising:
a memory system storing computer code; and
a processor in communication with the memory system that executes the computer code to:
generate a multi-service data model having a plurality of multi-service data elements and being specific to a single multi-service data warehouse that is a central consolidated database;
identify a plurality of service-specific data elements included in a plurality of service-specific databases;
automatically map the plurality of multi-service data elements in the multi-service data model to the plurality of service-specific data elements in the plurality of service-specific databases, wherein the mapping correlates each of the multi-service data elements in the plurality of multi-service data elements with one or more of the service-specific data elements in the plurality of service-specific data elements based on an association of the multi-service data element and of the one or more of the service-specific data elements with a common business category, the automatic mapping being performed by:
(a) automatically parsing the service-specific databases,
(b) based on the parsing, identifying from the service-specific databases the service-specific data elements and descriptions associated therewith,
(c) identifying descriptions of the multi-service data elements in the multi-service data model, and
(d) using the identified descriptions associated with the service-specific data elements and the identified descriptions of the multi-service data elements, mapping each of the service-specific data elements in the plurality of service-specific data elements to one of the multi-service data elements in the multi-service data model;
store mapping rules indicative of the mapping;
store, in the multi-service data model, transformation and translation rules for removing duplicated service-specific data elements identified from the service-specific databases;
automatically importing data from the service-specific databases into the single multi-service data warehouse, including:
  identifying data elements in the service-specific databases that are associated with a billing system, a revenue management system, a customer relation management system, and an ordering management system,
  applying the transformation and translation rules to the data elements for creating a single view for each of the data elements, and
storing the single view for each of the data elements in the single multi-service data warehouse according to the mapping rules.

13. The method of claim 11, wherein the method is performed by a computer system.

14. The non-transitory computer readable storage medium of claim 1, wherein:
a first portion of the service-specific data elements are included in at least one service-specific database of the plurality of service-specific databases that is associated with the customer relationship management application, and describe a sale cycle, a buyer, a product, and an employee, and wherein the first portion of the service-specific data elements are mapped to the multi-service data elements that include sales and marketing data elements; and
a second portion of the service-specific data elements are included in at least one service-specific database of the plurality of service-specific databases that is associated with a marketing automation application, and describe promotions, leads, prospects, response rate, and marketing effort, and wherein the second portion of the service specific data elements are mapped to the multi-service data elements that include the sales and marketing data elements.

* * * * *